United States Patent
Grabenstaetter (10) Patent No.: US 7,219,496 B2
(45) Date of Patent: May 22, 2007

(54) PRESSURE-LIMITING DEVICE IN A HYDRAULIC PATH FOR CLUTCH ACTUATION

(75) Inventor: Jan Grabenstaetter, Gernsbach (DE)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 0 days.

(21) Appl. No.: 11/129,863

(22) Filed: May 16, 2005

(65) Prior Publication Data
US 2005/0252209 A1    Nov. 17, 2005

(30) Foreign Application Priority Data
May 15, 2004    (DE) ................. 10 2004 024 309

(51) Int. Cl.
*F15B 7/00*    (2006.01)

(52) U.S. Cl. .......................... 60/591; 251/120

(58) Field of Classification Search ................ 60/591; 137/493.9; 138/45; 251/120
See application file for complete search history.

(56) References Cited

U.S. PATENT DOCUMENTS

| 3,385,637 | A | * | 5/1968 | Kersting ............... | 60/591 |
| 5,050,383 | A | * | 9/1991 | Nakaharai ............. | 60/591 |
| 5,479,779 | A | | 1/1996 | Havdal ................. | 60/591 |
| 5,937,988 | A | * | 8/1999 | Otto et al. ............ | 60/591 |
| 6,546,727 | B2 | * | 4/2003 | Bockling et al. ....... | 60/591 |

| 2004/0001229 | A1 | 1/2004 | Hanyu ............... | 358/2.1 |

FOREIGN PATENT DOCUMENTS

| DE | 1 785 882 | 3/1959 |
| DE | 37 36 584 | 5/1989 |
| DE | 43 34 551 | 4/1995 |
| DE | 44 35 258 | 5/1995 |
| DE | 103 11 482 | 9/2004 |
| JP | 02-256928 | 10/1990 |
| JP | 2002-188659 | 12/2000 |
| WO | 2004/010017 | 1/2004 |

* cited by examiner

*Primary Examiner*—Michael Leslie
(74) *Attorney, Agent, or Firm*—Davidson, Davidson & Kappel, LLC

(57) ABSTRACT

A pressure-limiting device in the hydraulic path for a clutch including at least one restrictor member having a central restrictor bore for pressure reduction and a cup-shaped retaining ring to which pressure is applied by a spring and the bottom of which has a central bore and, radially spaced therefrom, a plurality of radially spaced openings arranged on a reference circle. At least one of the restrictor member and the central restrictor bore is activatable when a predetermined volumetric flow rate of the fluid is exceeded during clutch engagement and the plurality of radially spaced openings is closable when a predetermined pressure drop is exceeded. The central restrictor bore can be activated independently of temperature because the surface area acting on the retaining ring is smaller in the unshifted state than during shifting, resulting with the temperature-dependent pressure losses caused by leakage between the retaining ring and housing being compensated for.

21 Claims, 5 Drawing Sheets

PRESSURE-LIMITING DEVICE IN A HYDRAULIC PATH FOR CLUTCH ACTUATION

Priority is claimed to German Patent Application No. DE 10 2004 024 309.3, filed on May 15, 2004, the entire disclosure of which is incorporated by reference herein.

The present invention relates to a pressure-limiting device in a hydraulic path for actuating a clutch of a vehicle, including at least one slave cylinder and a master cylinder, which are interconnected by a conduit through which flows a fluid.

BACKGROUND

The hydraulic actuation of the clutch pedal leads to sputtering phenomena of the engine when abruptly removing the foot from the clutch pedal, especially when operating the vehicle in the lower gears of the engine. To solve this problem, German Publication DE 1785 882 discloses an actuating device for vehicle clutches, which starts from an approach in which the slave cylinder is connected to an upstream non-return valve whose valve stem is provided with a return-flow hole for the hydraulic fluid in order that, when the clutch pedal is abruptly released, the return movement of the piston located in the slave cylinder is slowed down as a result of the throttling by the return flow movement. However, the deceleration cannot be achieved very effectively by throttle bores of this kind since the throttle bores must be kept very small in diameter because of the strong clutch spring forces. For that reason, German Publication DE 1 785 882 describes a solution where in the slave cylinder, a restricting plate is disposed between the cylinder bottom having the inlet bore and the slave piston, the restricting plate being acted upon by an energy storage device in a direction from the slave piston to the cylinder bottom. The restricting plate has a plurality of radially extending throttling grooves for decelerating the fluid flow so as to avoid sputtering phenomena of the engine in response to sudden movements of the clutch pedal.

In German Publication DE 37 36 584 A1, the objective of designing a hydraulic actuator such that peak loads are avoided even during extreme driving, which is associated with extreme clutch engagement speeds, and thus, with torque peaks, is attained by providing a throttle valve in the hydraulic line between the master cylinder and the slave cylinder. In this manner, the fluid flow is throttled.

Moreover, German Patent DE 43 34 551 C2 discloses a further hydraulic actuator for a clutch in the drivetrain of a motor vehicle. The objective achieved in this document is to provide, between the master cylinder and the slave cylinder in the hydraulic line connected to the actuator, a valve body in the form of a throttle valve whose closure member can be moved in a reliable way when lifting it off the sealing surface. This objective is achieved in that the closure member is provided with a cup-shaped extension in which is carried the compression spring, and in that the outer contour of the closure member facing the inner wall of the valve housing is designed such that hydraulic fluid may pass through in-between in an unhindered manner.

With these prior art solutions for an additional device disposed in the hydraulic path for actuating a vehicle clutch, the engagement speed of the clutch is reduced when the clutch is engaged with extremely rapid return movements of the pedal. This is done by throttling the fluid flow toward the master cylinder, thereby reducing the clutch engagement speed. The proposed solutions for throttling may possibly reduce rapid return movements. However, during normal operation, additional pressure reductions occur, which are perceived by the driver as an unpleasant decrease in pedal force. Moreover, this kind of throttling results in that the pressure reductions produced by these devices are temperature-dependent. This may lead to unwanted, greater pressure reductions, especially at low temperatures.

SUMMARY OF THE INVENTION

It is an object of the present invention to provide an inexpensive pressure-limiting device in the hydraulic path for a clutch of the type mentioned at the outset which both avoids torque peaks and/or extremely rapid return movements of the pedal in all operating situations and limits the clutch engagement speed with little technical effort.

Thus, the object is achieved by a pressure-limiting device provided in the hydraulic path for actuating a vehicle clutch; the hydraulic path including a slave cylinder and a master cylinder which are hydraulically interconnected by at least one conduit through which flows a fluid; the pressure-limiting device including at least one restrictor member having a central restrictor bore for pressure reduction and a retaining ring to which pressure is applied by a spring and the bottom of which has a central bore and, radially spaced therefrom, one or more openings arranged on a reference circle; and the restrictor member, and/or the central restrictor bore, being able to be activated when a predetermined volumetric flow rate of the fluid is exceeded during clutch engagement, in that the restrictor bore and the at least one retaining ring opening corresponding thereto are designed to be short, for example as short as practicably possible.

Because the restrictor bore of the housing and the opening(s) of the retaining ring are designed as bores of particularly short length, and because the surface area acting on the cup-shaped retaining ring is smaller in the unshifted state than during the shifting phase, the temperature-dependent pressure losses caused by leakage between the retaining ring and the housing are compensated for.

Thus, the proposed pressure-limiting device provides a so-called peak torque limiter (PTL) in which the restrictor member reduces the pressure during clutch engagement only at a predetermined volumetric flow rate, so that normal operation remains unaffected, while nevertheless avoiding unwanted torque peaks in the drivetrain. The pressure reductions produced by this device have the further advantage that the pressure drops are independent of temperature so that even at low temperatures, the limiting of the clutch engagement speed is not significantly increased.

In a refinement of the present invention, the restrictor member having at least one restrictor opening is axially movably disposed in a housing in such a manner that when the clutch is being disengaged, the restrictor member is able to be moved by the fluid flow against a first stop of the housing without reducing the pressure in the fluid flow, and when the clutch is being engaged, the restrictor member is able to be moved against a spring-loaded retaining ring which, when a predetermined volumetric flow rate is present, is moved further in such a manner that at least one of the restrictor openings is at least partially covered. This flow rate-dependent operation of the restrictor member enables particularly low-loss clutch actuation.

Preferably, the restrictor member is cup-shaped and has a restrictor opening in the form of at least one central restrictor bore or the like, allowing the flow to pass axially at least through the central restrictor bore, thereby achieving a desired pressure drop in the fluid flow to avoid the unwanted side effects caused by extremely rapid return movements. However, it is also possible to conceive of other embodiments of the restrictor member to optimize the flow rate-dependent pressure drop during clutch engagement.

In another advantageous embodiment of the present invention, to improve the restriction geometry of the central restrictor bore in order to avoid possible throttling losses due to the length of the restrictor bore, the central restrictor bore is chamfered for length optimization. The chamfer is preferably configured such that the restrictor bore tapers in the direction of flow toward the master cylinder. However, other shapes are also conceivable for the central restrictor bore. Altogether, this restriction geometry limits the pressure drop, in particular at low temperatures.

In one advantageous refinement of the present invention, to ensure passage of a certain volume of fluid, and thus, to reduce the pressure drop, additional restrictor openings are provided, for example, a plurality of axially extending grooves distributed around the circumference of the cup-shaped restrictor member, or the like.

To implement the inventive flow rate-dependent pressure change in the hydraulic path, the retaining ring is biased by the spring element or the like against a second stop of the housing in response to pressurization, the spring element bearing against this housing closure. The stop is implemented by a step change in the diameter inside the housing. The housing closure is also secured or supported on a diameter step.

In another embodiment of the present invention, the bottom of the retaining ring is provided with a plurality of openings. These openings preferably take the form of bores and serve to provide additional flow through the pressure-limiting device. The bores of the restrictor member are preferably arranged in such a manner that they can be at least partially brought into coincidence with the openings of the retaining ring. This corresponding arrangement of the bores and openings serves to reduce unwanted pressure reductions.

Thus, during normal operation, unwanted pressure reductions are avoided by moving the restrictor member against the spring-loaded retaining ring during clutch engagement in such a way that the fluid can flow through all restrictor openings of the restrictor member and through all bores of the retaining ring without significant pressure loss. This ensures that when the clutch is being actuated, pressure reductions occur only at predetermined volumetric flow rates of the fluid and, moreover, independently of the temperature.

However, when the force exerted by the fluid volume flow on the retaining ring is greater than the biasing force of the spring, the retaining ring is brought into abutment with the housing closure, so that fluid flows only through the restrictor bore, thus providing flow rate-dependent pressure reduction. This ensures that during clutch engagement, the restrictor member is activated only when the volumetric flow rate is above a predetermined value which is greater than the volumetric flow rate occurring during normal operation. However, below this predetermined volumetric flow rate, the pressure drops at the pressure-limiting device remain low.

In a further advantageous embodiment of the present invention, an additional housing is used in place of the housing closure, both housings being sealed off from each other by an O-ring. This solution has the advantage of allowing the device to be directly incorporated into the hydraulic line. To this end, the two housings are simply connected together by a bayonet coupling. Thus, both housings can be connected together in a reliable and rapid manner. In this embodiment, it is advantageous to provide openings near the bottom of the retaining ring on the circumference thereof in order to ensure the flow rate of the fluid.

However, these openings may just as well be made in the housing that serves as a closure for the pressure-limiting device. In that case, the openings should advantageously be arranged radially on the circumference of the extension of this second housing.

In another advantageous embodiment of the present invention, the pressure-limiting device is directly incorporated into the hydraulic connecting line between the master cylinder and the slave cylinder, or into the master or slave cylinder.

It is particularly advantageous and cost-effective if all components of the device, except for the spring, are made of plastic.

DESCRIPTION OF THE DRAWINGS

The present invention will be described in more detail below with reference to the drawings, in which:

FIG. 1a shows the positions of the restrictor member and the retaining ring during clutch disengagement;

FIG. 1b shows the positions of the restrictor member and the retaining ring during clutch engagement at a slow or medium clutch engagement speed;

FIG. 1c shows the positions of the restrictor member and the retaining ring during clutch engagement at a high clutch engagement speed;

FIG. 3a shows the position of the retaining ring during clutch disengagement;

FIG. 3b shows the position of the retaining ring during clutch engagement at a slow or medium clutch engagement speed;

FIG. 3c shows the position of the retaining ring during clutch engagement at a high clutch engagement speed.

DETAILED DESCRIPTION

Figure 1A:
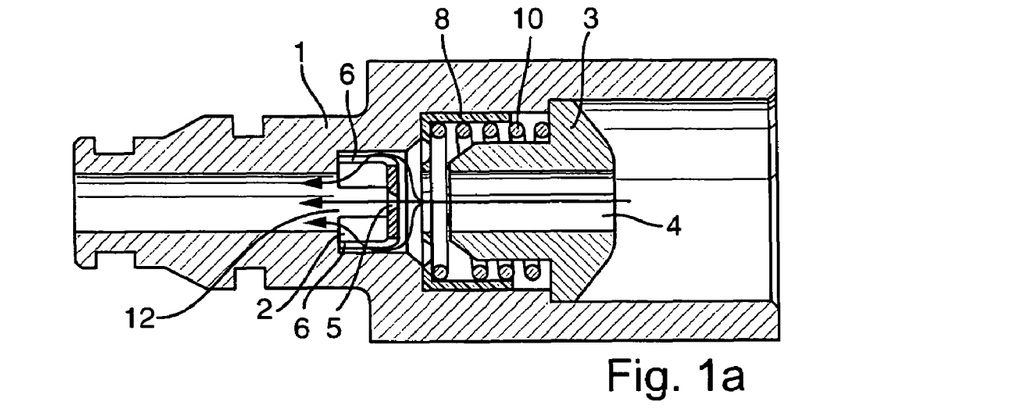
FIGS. 1a-1c schematically show a pressure-limiting device according to the present invention, including a restrictor member and a retaining ring, in three different positions.
Figure 1B:
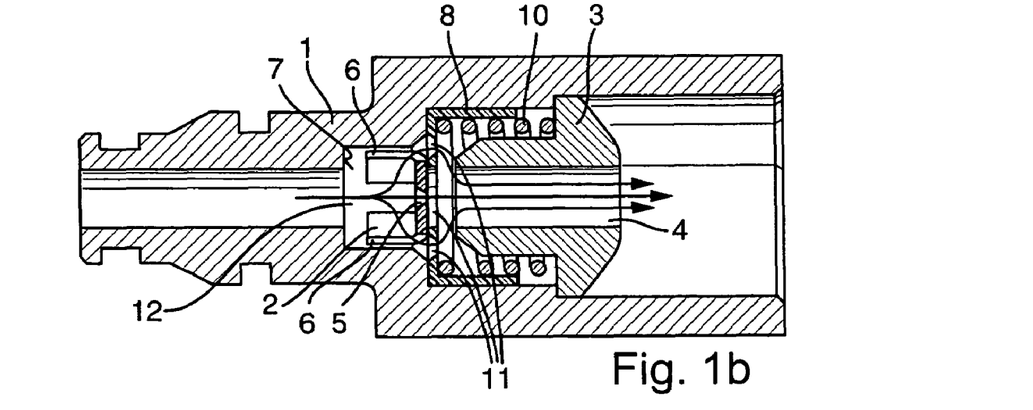
Figure 1C:
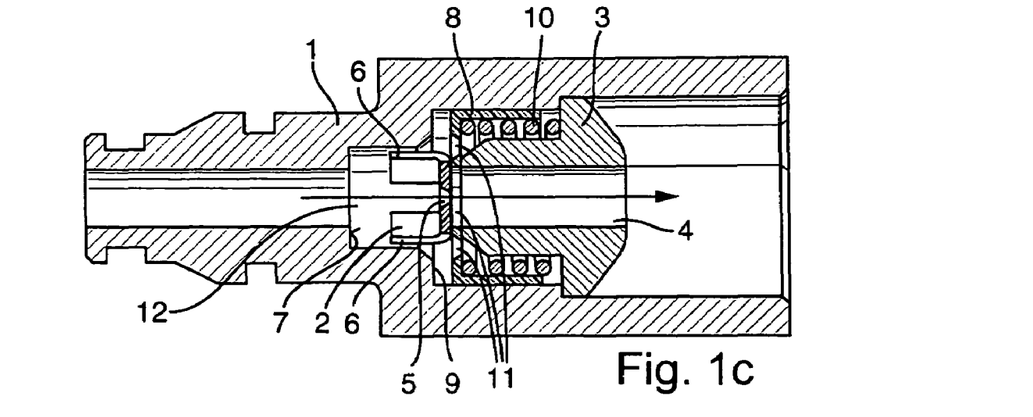

In FIGS. 1a through 1c, a first variant of a pressure-limiting device according to the present invention is shown in different detail views.

The pressure-limiting device has a housing 1, which is provided, for example, in the hydraulic line between a slave cylinder and a master cylinder. A restrictor member 2 is accommodated in housing 1 of the pressure-limiting device in such a way that it can move axially in housing 1. Housing 1 is closed by a housing closure 3 at the master cylinder end.

Housing closure 3 is essentially formed by an extension merging into a base portion, the diameter of the extension being smaller than that of the base portion. Housing closure 3 has inside a central bore 4 in the form of a through-bore for the passage of fluid. Moreover, a retaining ring 8 is disposed between restrictor member 2 and housing closure 3, the retaining ring being movable between two stops against a spring 10 radially supported on the extension of housing closure 3. One stop is formed by housing 1 (stop 9), and the other stop is formed by the increased-diameter base portion of housing closure 3. The axial movement of restrictor member 2 inside central bore 12 is limited by stop 7 of housing 1 on the slave cylinder side and by retaining ring 8 on the master cylinder side.

Furthermore, restrictor member 2 is cup-shaped and has a restrictor opening in the form of a central restrictor bore 5. Also provided are a plurality of grooves 6 which are distributed on the circumference and extend over the length of restrictor member 2. Restrictor member 2 is axially movable within central bore 12, the path being terminated on the slave cylinder side by a fist stop 7 formed by a step in the diameter of housing 1.

FIG. 1*a* shows the position of the restrictor member 2 during clutch disengagement. During this process, restrictor member 2 is pushed against stop 7 of housing 1, and fluid flows around it. From FIG. 1*a*, it can be seen that at this point in time, both restrictor member 2 and retaining ring 8 are in contact with the two stops 7 and 9 of housing 1. In this condition, the fluid flows through both components, the fluid flow passing through bores 4, 5, 12 and grooves 6. Spring 10 exerts a predetermined biasing force on retaining ring 8, thereby pressing it against stop 9 of housing 1. In this position, the flow passes through housing closure 3, retaining ring 8 and restrictor member 2 virtually without pressure drop. The direction of flow and the path of the fluid are indicated by the arrows shown in FIGS. 1*a* through 1*c*.

In this first exemplary embodiment of the pressure-limiting device of the present invention, restrictor bore 5 tapers in the direction of flow toward the master cylinder. Furthermore, retaining ring 8 has at least one opening 11 at its bottom for the passage of fluid.

FIG. 1*b* illustrates that during clutch engagement, the positions of restrictor member 2 and retaining ring 8 do not produce any significant pressure drop either. This is accomplished because, during clutch engagement, the fluid flowing toward the master cylinder pushes restrictor member 2 against retaining ring 8. In this instance, the fluid can flow unhindered through restrictor bore 5 and through openings 11 in retaining ring 8, and through bore 4 of housing closure 3 without causing a pressure drop.

If, as shown in FIG. 1*c*, the volumetric flow rate exceeds a predetermined value during clutch engagement, restrictor member 2 comes into action and produces a pressure drop. This achieved in that, due to the force resulting from the increasing volumetric flow rate, restrictor member 2 further lifts retaining ring 8 off second stop 9 of housing 1 against the force of spring 10, which may thereby be compressed to its maximum density, the restrictor member 2 pushing retaining ring 8 toward housing closure 3 until the retaining ring contacts the end of the extension of housing closure 3. In this position, the flow can only pass through restrictor bore 5, so that a maximum pressure drop is produced.

During the shifting process, the pressure drop decreases depending on the temperature because of an additional leak between retaining ring 8 and housing 1, which may vary considerably, especially if housing 1 and retaining ring 8 are made of plastic. Because of this, the volumetric flow must be further increased by retaining ring 8 independently of the temperature in order to complete the shifting (clutch operation). To ensure immediate complete shifting without increasing the volumetric flow rate when retaining ring 8 is lifted off stop 9, the surface area acting on retaining ring 8 is smaller in the unshifted state than during the shifting phase, as a result of which temperature-dependent pressure losses occurring during the shifting phase because of the leakage between retaining ring (8) and housing (1) are compensated for since, due to the larger surface area during the shifting phase, less pressure drop is needed to reach the spring force.

Figure 2:
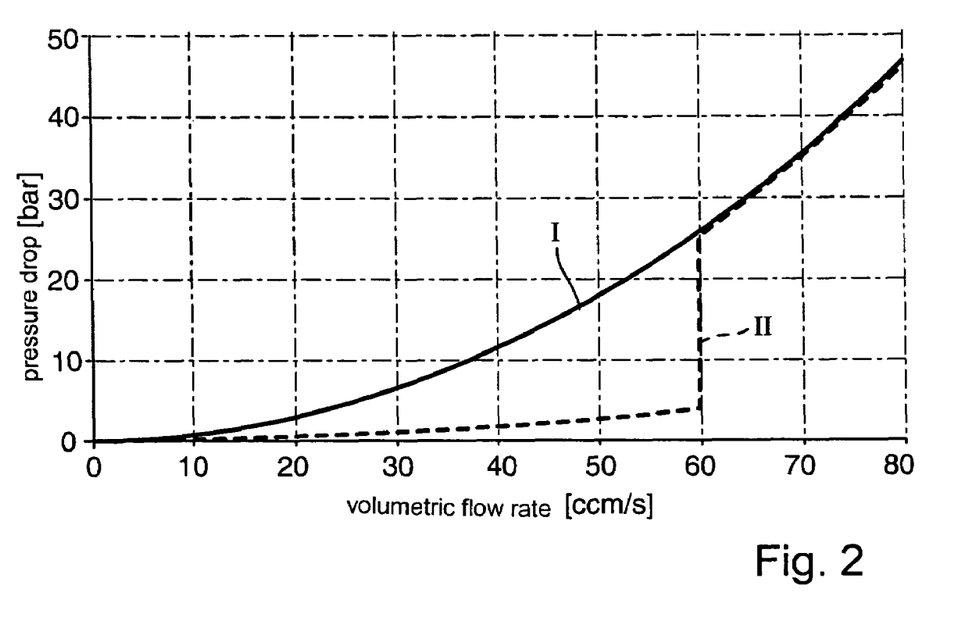
FIG. 2 is a graphical representation of the variant of FIG. 1 for different curves of a pressure drop in the volume flow in a hydraulic line.

FIG. 2 shows the pressure drop that occurs during clutch engagement in the variant of FIG. 1 as a function of the volumetric flow rate. Curve I shows the pressure drop with the restrictor constantly activated. In contrast, curve II shows the pressure drop for flow rate-dependent activation of the restrictor, as is achieved by the pressure-limiting device of the present invention.

A comparison of the two curves I and II shows that a constantly activated restrictor would produce an unwanted pressure drop also during normal operation. However, using the pressure-limiting device of the present invention, such a pressure drop is produced only in response to high volumetric flow rates during clutch engagement.

Figure 3A:
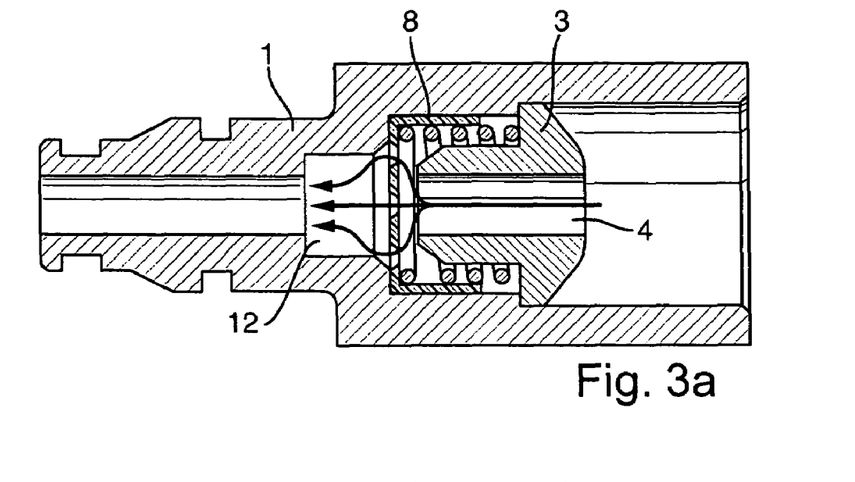
FIGS. 3a-3c schematically show another variant of the inventive pressure-limiting device without restrictor member in three different positions.
Figure 3B:
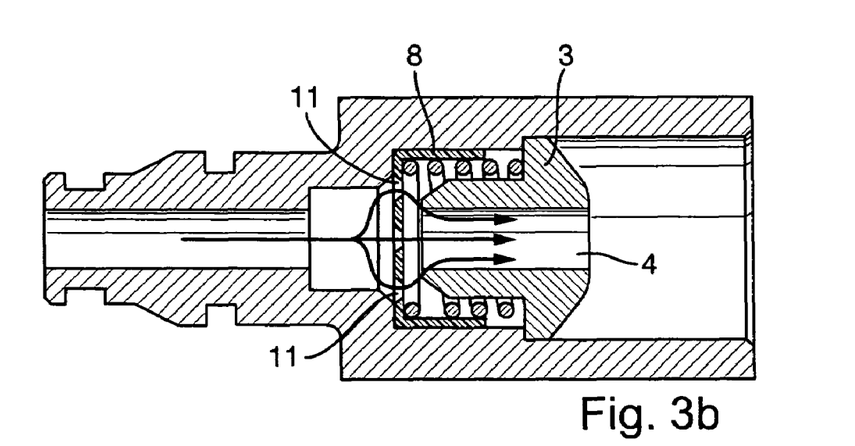
Figure 3C:
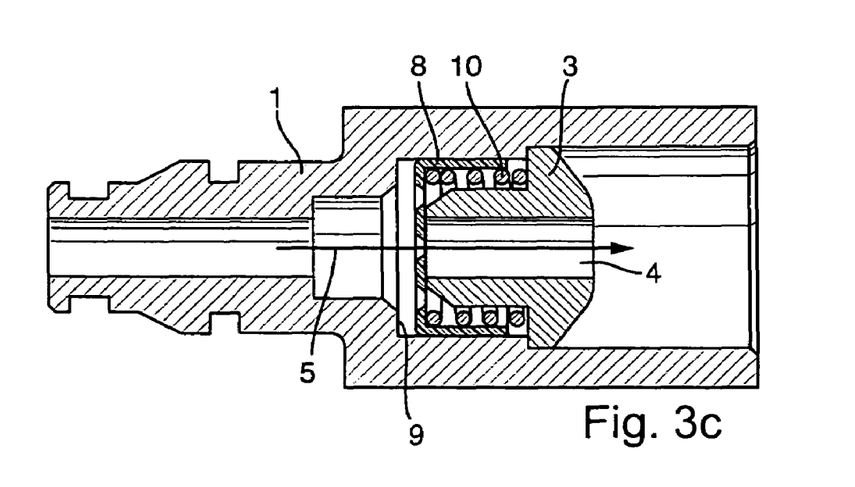

FIGS. 3*a* through 3*c* show a further variant of a pressure-limiting device. The primary difference from the embodiments described above is that in this embodiment, restrictor member 2 and retaining ring 8 are combined into one piece.

The pressure-limiting device according to FIGS. 3*a* through 3*c* includes a housing 1 having a housing closure 3, and a movable, cup-shaped retaining ring 8 having a centrally disposed restrictor bore 5 and at least one openings 11 provided at the bottom around centrally disposed restrictor bore 5. Housing 1 and housing closure 3 form the two stops for retaining ring 8. Retaining ring 8 is pressed against housing 1 by spring 10, which bears against housing closure 3.

During clutch disengagement, according to FIG. 3*a*, retaining ring 8 is pressed against housing 1 and flow passes through restrictor bore 5 and openings 11. During clutch engagement, according to FIG. 3*b*, the fluid flows through restrictor bore 5 and openings 11 as well. Therefore, since the flow passes through a plurality of bores, the pressure drops remain low. The pressure drop increases with the volumetric flow rate. When the pressure drop becomes greater than the preload of spring 10 pressing retaining ring 8 against stop 9 of housing 1, retaining ring 8 is lifted off housing 1 and pressed against housing closure 3 (see FIG. 3*c*). When retaining ring 8 contacts housing closure 3, the flow can only pass through restrictor bore 5. The pressure drops increase suddenly, resulting in a reduction in the clutch engagement speed.

The surface area acting on the retaining ring 8 is smaller in the unshifted state than during the shifting phase, as a result of which the temperature-dependent pressure losses caused by leakage between retaining ring 8 and housing 1 are compensated for, and the shifting process is independent of temperature.

FIGS. 4*a* through 4*d* schematically show, in different pressure situations, a further exemplary embodiment of a pressure-limiting device, in which an additional housing part 3*a* is used in place of housing closure 3, and in which almost no pressure drops occur during clutch disengagement. Therefore, in these Figures, the pressure-limiting device is embedded between two housing parts which are sealed off from each other by an O-ring and axially held together by a bayonet coupling. To this end, the force of spring 10 is used, which presses the bayonet coupling into the locked position, which prevents unintentional unscrewing of the closure. As shown in FIGS. 4a through 4d, housing part 3a may be a cup shaped housing closure.

Figure 4A:
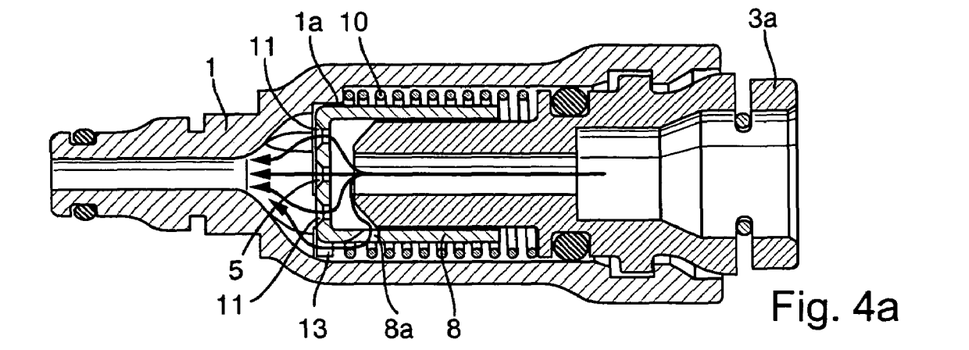
FIGS. 4a-4d schematically show another variant of the inventive pressure-limiting device in which the housing closure is formed by a second housing.

FIG. 4a shows a pressure-limiting device in a clutch disengagement situation. Retaining ring 8, which is radially supported on the extension of a housing 3a, is pressed by the fluid against housing 1. The fluid flows through restrictor bore 5 and openings 11 and, in addition, through one or more openings 8a in retaining ring 8. Retaining ring 8 has protrusions 13 via which fluid can flow through openings 8a toward the clutch and by means of which retaining ring 8 can enter housing 1 past the protuberances 1a. Openings 8a ensure that almost no pressure drops occur in the pressure-limiting device during clutch disengagement.

Figure 4B:
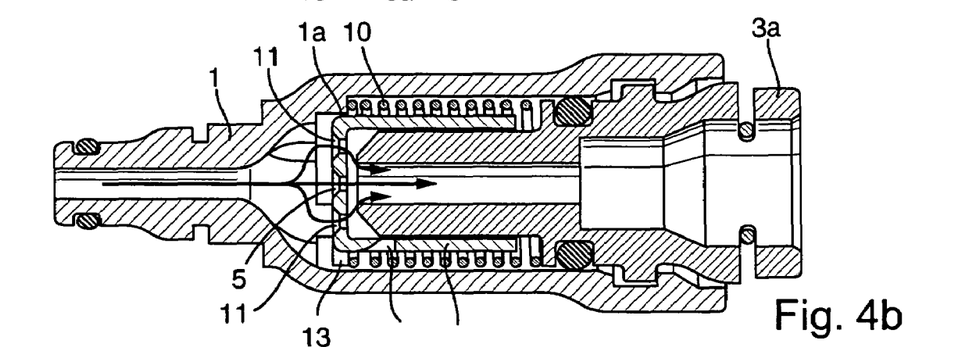

FIG. 4b shows the pressure-limiting device during clutch engagement. In this situation, retaining ring 8 is pushed by the fluid against spring 10. The spring bears against protuberances 1a of housing 1 and is thereby preloaded to a predetermined force. Due to the movement of retaining ring 8 toward housing 3a, openings 8a of retaining ring 8 are closed. Now, the fluid can only pass through restrictor bore 5 and openings 1, as a result of which the pressures drops do increase, but nevertheless remain low. The pressure drop increases with the volumetric flow rate.

Figure 4C:
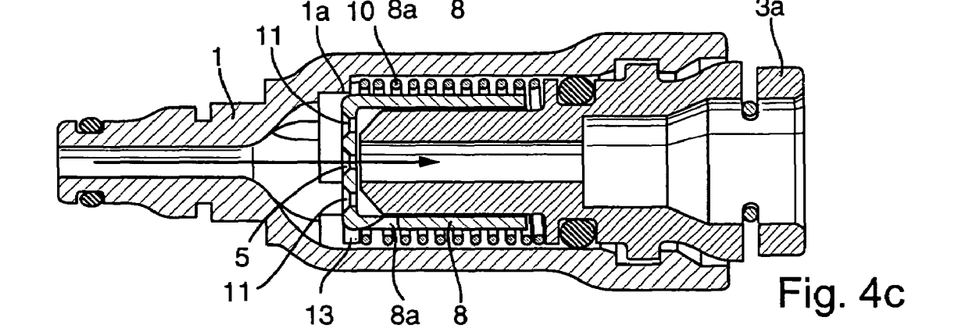

When the pressure drop becomes greater than the preload force of spring 10, retaining ring 8 compresses spring 10 until the retaining ring has reached the end face of housing 3a (see FIG. 4c). The fluid can then only flow through restrictor bore 5, as a result of which the pressure drops increase significantly, and the clutch engagement speed is reduced again.

Figure 4D:
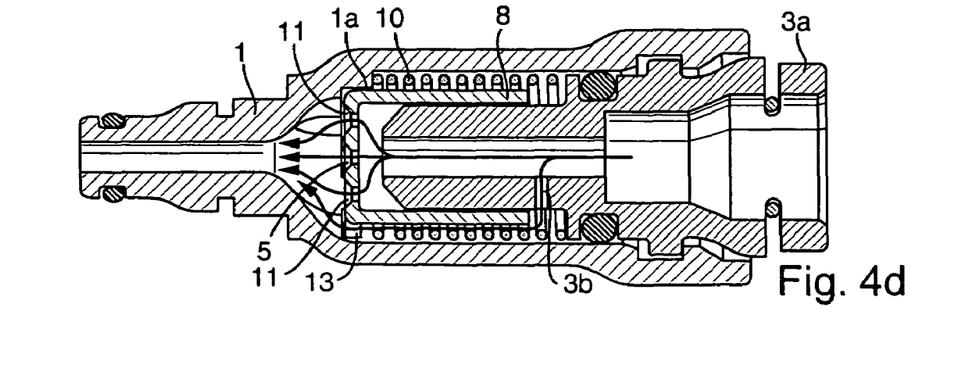

FIG. 4d shows a further embodiment of the pressure-limiting device. Instead of making openings 8a in retaining ring 8, it is equally possible to provide one or more openings 3b in housing 3a. These openings 3b are likewise closed by retaining ring 8 during clutch engagement.

Figure 5:
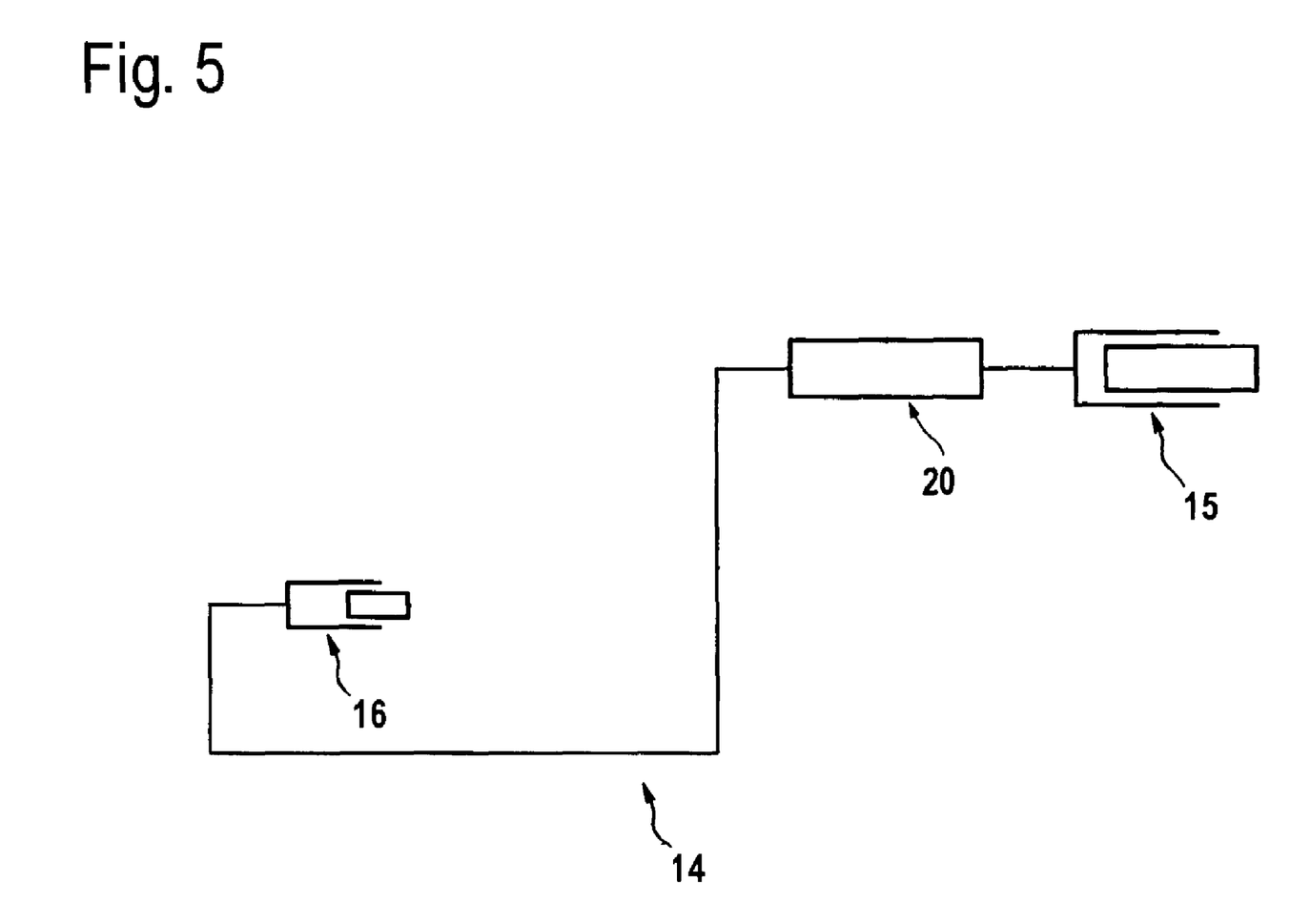
FIG. 5 shows a schematic representation of a hydraulic system wherein a pressure-limiting device is disposed in a hydraulic connecting line between a master cylinder and a slave cylinder.

FIG 5. shows a schematic representation of a hydraulic system wherein a pressure-limiting device 20 is disposed in a hydraulic connecting line 14 between a master cylinder 15 and a slave cylinder 16.

What is claimed is:

1. A pressure-limiting device in a hydraulic path for actuating a clutch, the hydraulic path including a slave cylinder and a master cylinder hydraulically interconnected by at least one conduit through which a fluid flows, the pressure-limiting device comprising:
   a restrictor member having a central restrictor bore for pressure reduction;
   a cup-shaped retaining ring having a bottom that includes a central retaining ring bore and at least one radially spaced opening spaced radially from the central retaining ring bore disposed on a reference circle in the bottom, wherein each of the restrictor bore and the at least one radially spaced opening having a short length;
   a spring applying pressure to the retaining ring;
   wherein at least one of the restrictor member and the central restrictor bore is activatable when a predetermined volumetric flow rate of the fluid is exceeded during an engagement of the clutch and the at least one radially spaced opening is closable when a predetermined pressure drop is exceeded.

2. The pressure-limiting device as recited in claim 1, further comprising a housing having a first stop and wherein the restrictor member is axially movably disposed in the housing so that, during a disengagement of the clutch, the fluid flow is capable of moving the restrictor member against the first stop without reducing the pressure, and that, during the engagement of the clutch, the restrictor member is movable against the retaining ring such that the at least one radially spaced openings is closable when the predetermined volumetric flow rate is exceeded.

3. The pressure-limiting device as recited in claim 2, wherein the housing includes a second stop and wherein the retaining ring is biased by the spring against the second stop.

4. The pressure-limiting device as recited in claim 2, further comprising a housing closure having an enlarged base section and an extension and wherein the housing includes a second stop, the spring being carried on the extension and being axially braced between the second stop and the enlarged base portion.

5. The pressure-limiting device as recited in claim 4, wherein the spring is carried between the retaining ring and the extension.

6. The pressure-limiting device as recited in claim 4, wherein the housing closure has a bore.

7. The pressure-limiting device as recited in claim 4, wherein the spring is supported radially by a wall of the cup-shaped retaining ring and a wall of the housing closure.

8. The pressure-limiting device as recited in claim 1, wherein the central restrictor bore is chamfered.

9. The pressure-limiting device as recited in claim 1, wherein the restrictor member includes a plurality of axially extending grooves disposed on a circumference of the restrictor member.

10. The pressure-limiting device as recited in claim 1, wherein the at least one radially spaced opening includes a plurality of radially spaced openings, each of the plurality of radially spaced openings being restrictors and including chamfered bores.

11. The pressure-limiting device as recited in claim 1, wherein, during the engagement of the clutch, the restrictor member is movable against the retaining ring such that the fluid flows through the restrictor bore, the central retaining ring bore and the at least one radially spaced bore without significant pressure loss.

12. The pressure-limiting device as recited in claim 1, wherein, when a force exerted by the fluid volume flow on the retaining ring is greater than the biasing force of the spring, the retaining ring is moveable into a position in abutment with the housing closure, so that the fluid flows only through the restrictor bore and the central retaining ring bore with a predetermined pressure reduction.

13. The pressure-limiting device as recited in claim 1, wherein the pressure-limiting device is disposed in a hydraulic connecting line between the master cylinder and the slave cylinder.

14. The pressure-limiting device as recited in claim 1, wherein the pressure-limiting device is disposed into one of the master cylinder and the slave cylinder.

15. The pressure-limiting device as recited in claim 1, the restrictor member and the retaining ring are made of plastic.

16. A pressure-limiting device in a hydraulic path for actuating a clutch, the hydraulic path including a slave cylinder and a master cylinder hydraulically interconnected by at least one conduit through which a fluid flows, the pressure-limiting device comprising:
   a housing;
   a cup-shaped retaining ring having a bottom that includes a central retaining ring bore and at least one radially spaced opening spaced radially from the central retaining ring bore disposed on a reference circle in the bottom, the at least one radially spaced opening having a short length;

a spring contacting the retaining ring;

wherein the at least one radially spaced opening is closable when a predetermined pressure drop is exceeded.

17. The pressure-limiting device as recited in claim 16, further comprising a housing closure having an enlarged base section and an extension and wherein the housing includes a first stop, the spring being carried on the extension and being axially braced between the first stop and the enlarged base portion;

the housing closure being cup shaped and having a bore.

18. The pressure-limiting device as recited in claim 16, further comprising a housing closure having an enlarged base section and an extension and wherein the housing includes a first stop, the spring being camed on the extension and being axially braced between the first stop and the enlarged base portion;

wherein the housing closure is sealed with respect to the housing.

19. The pressure-limiting device as recited in claim 18, wherein the housing closure is sealed with respect to the housing using at least one of an O-ring and a bayonet coupling.

20. The pressure-limiting device as recited in claim 18, wherein the housing closure includes a plurality of radially arranged housing openings distributed on a circumference.

21. The pressure-limiting device as recited in claim 16, wherein the retaining ring includes further openings on a circumference of the retaining ring near the bottom.

* * * * *